United States Patent

Ito

[19]

[11] Patent Number: 5,218,628
[45] Date of Patent: Jun. 8, 1993

[54] RADIO COMMUNICATION APPARATUS WITH MEANS FOR REQUESTING AND DISPLAYING STATUS OF WIRED LINE

[75] Inventor: Koichi Ito, Hino, Japan

[73] Assignee: Kabushiki Kaisha Toshiba, Kawasaki, Japan

[21] Appl. No.: 589,019

[22] Filed: Sep. 27, 1990

[30] Foreign Application Priority Data

Sep. 29, 1989 [JP] Japan .................. 1-256695

[51] Int. Cl.⁵ .......................... H04M 11/00
[52] U.S. Cl. ........................ 379/58; 379/63; 379/209
[58] Field of Search ............ 379/58, 59, 61-63, 379/209

[56] References Cited

U.S. PATENT DOCUMENTS

| | | | |
|---|---|---|---|
| 4,481,382 | 11/1984 | Villa-Real | 379/61 |
| 4,731,814 | 3/1988 | Becker et al. | 379/62 |
| 4,768,218 | 8/1988 | Yorita | 379/63 |

FOREIGN PATENT DOCUMENTS 0058455 2/1990 Japan .................. 379/63

*Primary Examiner*—Curtis Kuntz
*Assistant Examiner*—Dwayne D. Bost
*Attorney, Agent, or Firm*—Finnegan, Henderson, Farabow, Garrett & Dunner

[57] ABSTRACT

A radio communication apparatus used generally indoors and including a base unit connected to at least one wired line and a plurality of mobile units connected to the base unit through respective radio communication channels. Each mobile unit is able to know the status of use—busy, hold or idle—of the wired lines. Each mobile unit makes to the base unit a request for information on the status of use of the wired line. The base unit sends to the mobile unit the information on the status of use of the wired line in response to the request, which status is displayed in the respective mobile units.

16 Claims, 14 Drawing Sheets

| LINE CODE | LINE USE STATUS |
|---|---|
| 001 | → Z |
| 002 | → X |
| ⋮ | ⋮ |
| 00i | → Y |

FIG. 6

IDLE LINE CODE 001, 005, ·····

FIG. 7

RADIO COMMUNICATION APPARATUS WITH MEANS FOR REQUESTING AND DISPLAYING STATUS OF WIRED LINE

BACKGROUND OF THE INVENTION

1. Field of the Invention

The present invention relates to a radio communication apparatus comprising a base unit connected to at least one wired line and a plurality of mobile units connected through radio communication channels to the base unit, and more particularly to a radio communication apparatus in which each of the mobile units is able to know whether the wired line connected to the base unit is in a communication state, in a hold state or in an idle state.

2. Description of the Related Art

A radio communication apparatus of this type is generally provided and used inside the buildings, and connected to wired lines such as public telephone lines. The apparatus includes a base unit disposed at a fixed position inside a room and mobile units connected to the base unit through radio communication channels. Each mobile unit captures the wired line through the base unit and starts communication with an incoming caller or a destination party.

FIG. 15 illustrates the structure of a radio communication apparatus wherein a base unit 1 is connected through a radio communication channel to a mobile unit 2 and also to a wired telephone line 3.

In the base unit 1, a voice signal from the wired telephone line 3 is supplied as a modulating input to a transmitter 6 through a line relay 4 and a hybrid circuit 5, and the transmitter 6 transmits the modulated voice signal through a transmission antenna 7 to the mobile unit 2. The voice signal transmitted from the mobile unit 2 is received by a reception antenna 8 and demodulated by the receiver 9. The demodulated voice signal is delivered to the wired line 3 through the hybrid circuit 5 and a line relay 4 in a closed state. A synthesizer 10 generates a signal having a frequency corresponding to a control channel and one of a plurality of speech channels to the transmitter 6 and to the receiver 9. The transmitter 6 and the receiver 9 transmit and receive signals through the channel corresponding to the frequency of the signal from the synthesizer 9, respectively.

One of the outputs from the receiver 9 is input to a received field detector 11 for determining the received field strength. The detector 11 is generally referred to as a carrier squelch circuit or a noise squelch circuit.

Another output from the receiver 9 includes a data signal contained in the demodulated received waves and is input to an identification signal detector 12 which checks an identification signal determined by the combination of the host and mobile units 1 and 2. The identification signal is generally referred to as an ID code.

The output of the detector 11 and the demodulated output of the data signal are input to a control circuit 13 for connection control. The control circuit 13 performs a controlling operation such as a control of the synthesizer 10 and hence a control of radio channels, and delivery of a transmitted data signal as a modulating input to the transmitter 6.

A call signal detector 14 detects a call signal arriving from the wired telephone line 3 and informs the control circuit 13 of the arrival.

A rectifying and stabilizing circuit 15 converts an AC voltage available through an AC plug 16 into a DC voltage, which is supplied to the respective elements of the base unit 1 and applied also through a limiting resistor 17 across a pair of charging terminals 18a and 18b.

The mobile unit 2 includes a reception antenna 21 and a receiver 22. The electric waves from the base unit 1 are received by the reception antenna 21 and the resulting signal is demodulated by the receiver 22 which outputs the demodulated signal or voice signal to an ear piece 23. A voice signal from a mouth piece 24 is delivered as a modulating input to the transmitter 25 and transmitted from the transmission antenna 26. A synthesizer 27, a received field detector 28, and an identification signal detector 29 are similar to those of the base unit 1. A control circuit 30 controls the mobile unit 2. A dialing unit 31 is operated to input dialing data, etc., to the control circuit 30. A hook switch 32 is operated to select between the off-hook state and the on-hook state. A speaker 33 is a sounder which generates a ringing tone when there is an incoming call.

A secondary battery 34 supplies voltages to the required elements of the radio telephone 2. The battery 34 is charged through a current limiting resistor 17 from the rectifying and stabilizing circuit 15 of the base unit 1 when the terminals 35a and 35b are connected to the charging terminals 18a, 18b, respectively.

When there is an incoming call signal in the apparatus, control is provided substantially in accordance with the flowchart of FIG. 16. When the call signal detector 14 detects a call signal from the wired telephone line 3 when the base unit 1 is in its standby state (step 101), the synthesizer 10 is set in the control channel to turn on the transmitter 6 to thereby transmit a notice signal indicative of the reception of the call signal to the mobile unit 2 (step 102). The notice signal also includes a signal designating a speech channel S-CH.

On the other hand, the mobile unit 2 turns on the synthesizer 27 for a predetermined time t1 during its standby to set the synthesizer in the control channel and to turn on the receiver 22 (step 201). When the notice signal is received at this time (step 202), the transmitter 25 is turned on (step 203) to send a notice signal responsive signal to the base unit (step 204) to thereby select the designated speech channel S-CH (step 205). If no notice signal is received, the synthesizer 27 and the receiver 22 are turned off for a predetermined time t2 (step 206).

Intermittent reception by turning on/off the receiver is referred to as battery saving.

The average current IA consumed in the standby in the mobile unit state is given by $IA = (t1 \times Ion + t2 \times Ioff)/(t1 + t2)$ where Ioff is the current consumed when the receiver is off and Ion is the current consumed when the receiver is on. Since $Ion \gg Ioff$ usually, the consumed current IA is low.

When the received field detector 11 of the base unit 1 detects the electric waves from the mobile unit 2 (step 103), transmission of the notice signal is stopped (step 104). If no electric waves are detected, the notice signal is transmitted successively up to a predetermined number of (n) times (step 105). The reason why the notice signal is successively transmitted so is that the mobile unit 2 cannot receive the notice signal for t2 because of its intermittent reception. Thus, the notice signal transmitted is required to be two signal wavelengths longer than t2. The reason why the transmission of the notice signal more than n times is stopped is to avoid unnecessarily long occupation of the control channel when the mobile unit 2 is not powered up or is located at an excessively distant place.

The base unit 1 determines whether the ID code contained in the notice signal responsive signal received when the received field is detected coincides with a registered one or not. If so, (step 106), the speech channel S-CH designated by the notice signal is selected (step 107). If the ID code does not coincide, the notice signal responsive signal may be from another radio communication device, so that the standby state of the base unit is restored when the calling signal from the wired telephone line 3 has disappeared (step 108).

After the speech channel S-CH is selected, the base unit 1 sends a bell ringing signal (step 109). When the mobile unit 2 receives it (step 207), the speaker 33 generates a calling tone (step 208). If the off-hook switch goes off-hook at this time (step 209), an off-hook signal is sent to the base unit (step 210) to thereby result in a telephone communication state (step 211).

When the base unit 1 receives the off-hook signal (step 110), it stops the transmission of the bell ringing signal (step 111), and closes the line relay 4 to form a speech loop with the wired telephone line 3 to bring about a telephone communication state (step 112).

When the frequency of transmitting the notice signal arrives at n, the base unit 1 returns to its standby state after it detects the end of the notice signal (step 113) to thereby prevent unnecessary signal receiving operation from being performed again.

Control of call origination is provided substantially in accordance with the flowchart of FIG. 17. When the hook switch 32 is switched on to bring about the off-hook state in the mobile unit 2, call origination starts (step 301) to set the synthesizer 27 in the control channel C-CH and to turn on the receiver 22 (step 302). At this time, the received field detector 28 checks whether the control channel is idle (step 303) and, if so, turns on the transmitter 25 to thereby cause same to send a call origination signal (step 304). The call origination signal includes an ID code.

The base unit 1 sets the synthesizer 10 in the control channel when the base unit is in its standby state to maintain the receiver 9 on. When the receiver 9 receives a call origination signal (401), it determines whether the ID code contained in the call origination signal coincides with the registered one or not (step 402). If the ID code coincides, the transmitter 6 is turned on to send a responsive signal to the mobile unit (step 403). The responsive signal includes an ID code and a signal designating a speech channel S-CH. Thereafter, the synthesizer 10 is changed from the control channel C-CH to the speech channel S-CH designated by the responsive signal (step 404) to thereby close the line relay 4 to bring about a telephone communication state.

The mobile unit 2 continues to detect electric waves from the base unit 1 using the received field detector 28 until a time t has passed (steps 305, 306). If the detector 28 detects a received field when the responsive signal is received, it checks whether the ID code contained in the responsive signal coincides with the registered one. If so (step 307), it switches the synthesizer 27 to the speech channel designated by the responsive signal (step 308) to thereby bring about a telephone communication state. If the ID code does not coincide, the responsive signal may be from another radio communication device, so that the mobile unit returns to its standby state. If no electric waves from the base unit 1 are detected even if a time t has passed, the speaker 33 generates an alarm sound indicating that connection is impossible because the host and mobile units 1 and 2 are, for example, excessively distant from each other (step 309), and the mobile unit returns its standby state.

FIG. 18 illustrates a modification of the radio communication apparatus as mentioned above. In FIG. 18, the base unit 51 has a plurality of wired lines 52-1 to 52-m connected thereto and a plurality of mobile units 53-1 to 53-n connected thereto through radio communication channels. In this case, the mobile unit 53-1 to 53-n share the wired lines 52-1 to 52-m through the base unit 51. An ID code is allocated to each of the combinations of the mobile units 53-1 to 53-n with the base unit 51, so that the call reception and origination shown with reference to FIGS. 16 and 17 are possible with the respective mobile units.

Since the mobile units share the plurality of wired lines, they can use the radio communication apparatus more efficiently if they can know whether the respective wired lines are in use. For example, if (1) pieces of information on busy lines, held lines and idle lines are displayed in the mobile units, (2) the base unit is informed by the mobile units of the desired wired lines in accordance with the displayed pieces of information and (3) the mobile units are connected to the corresponding desired wired lines through the base unit, the radio communication apparatus will be used more efficiently.

However, as mentioned above, when a mobile unit is in its standby state, its transmitter is off and the mobile unit is placed in an intermittent reception state for battery saving purposes. Thus, information cannot be exchanged when required between the standby state mobile unit and the base unit. Therefore, the mobile units require some new improvements thereon in order to know the status of the wired lines.

SUMMARY OF THE INVENTION

It is an object of the present invention to provide a radio communication apparatus including a base unit and a plurality of mobile units in which the mobile unit is able to know the status of use of the wired lines to thereby use them more efficiently.

A radio communication apparatus according to the present invention comprises a base unit connected to at least one wired line and a plurality of mobile units associated with the base unit and connected to the base unit through respective radio communication channels, wherein there are provided a connection controller provided in the base unit for allocating one of the mobile units to the wired line, and controlling the connection between the wired line and the allocated mobile unit, an information request section for sending an information request for information on the status of use of the wired line from the mobile units to the base unit, a request responding section for sending information on the status of use of the wired line from the base unit to the mobile units responsive to the information request, and a display provided at each of the mobile units, for displaying the status of use of the wired line in accordance with the information sent form the base unit by the request responding section.

According to the present invention, the information on the status of use of the wired lines is sent from the base unit to the mobile units and the status of use of the wired lines are displayed on the basis of the information on the display of the mobile units. Thus, the mobile units are able to know the status of the wired lines.

BRIEF DESCRIPTION OF THE DRAWINGS

FIG. 6 illustrates one example of display in a mobile unit FIG. 1;

FIG. 7 illustrates another example of display in a mobile unit of FIG. 1;

DETAILED DESCRIPTION OF THE PREFERRED EMBODIMENTS

Embodiments of the present invention will now be described in detail with reference to the accompanying drawings.

Figure 1:
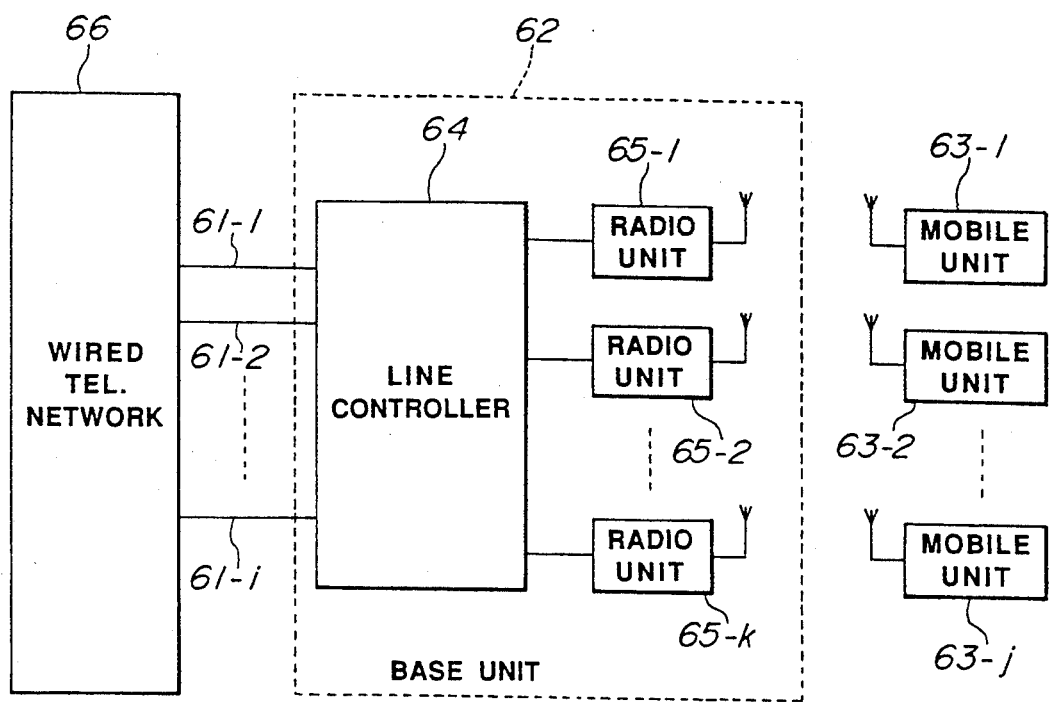
FIG. 1 is a block diagram illustrating one embodiment of a radio communication apparatus according to the present invention.

FIGS. 1-7 show one embodiment of a radio communication apparatus according to the present invention. FIG. 1 schematically illustrates the structure of the embodiment. Cable telephone lines 61-1 to 61-i from a wired telephone network 66 are connected to a base unit 62 to which a plurality of mobile units 63-1 to 63-j are connected through radio communication channels.

The base unit 62 includes a line controller 64 and a plurality of radio units 65-1 to 65-k connected to the line controller 64.

Figure 2:
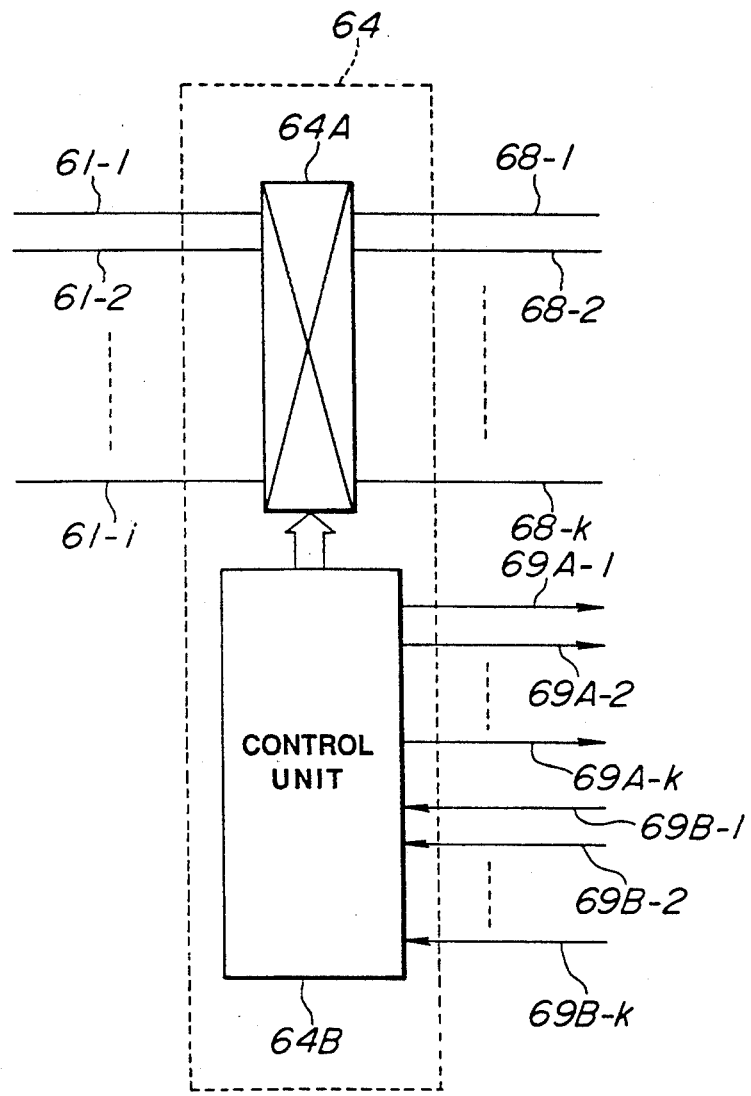
FIG. 2 is a block diagram illustrating a line controller of FIG. 1.

FIG. 2 is a block diagram of the line controller 64. In FIG. 2, a switch unit 64A includes crossbar switches and connects the wired lines 61-1 to 61-i to speech lines 68-1 to 68-k from the corresponding radio units 65-1 to 65-k. A control unit 64B controls the switch 64A and sends and receives control signals to and from the radio units 65-1 to 65-k through control lines 69A-1 to 69A-k and 69B-1 to 69B-k.

Figure 3:
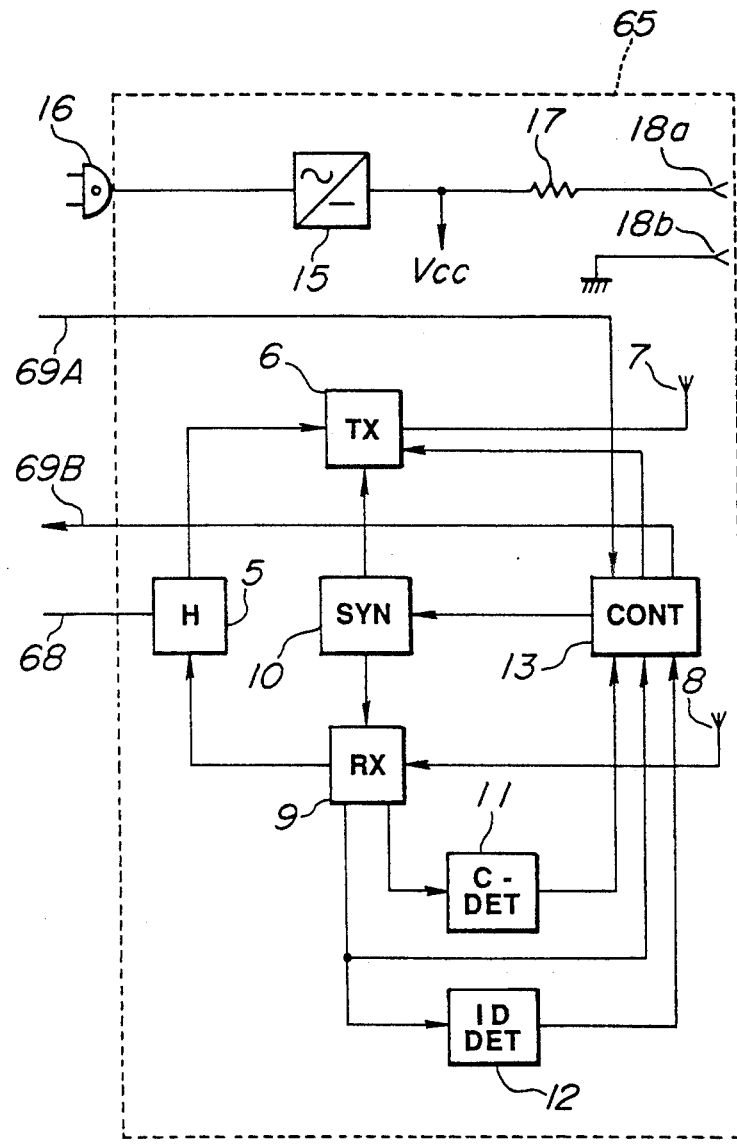
FIG. 3 is a block diagram illustrating a radio unit of FIG. 1.
Figure 15:
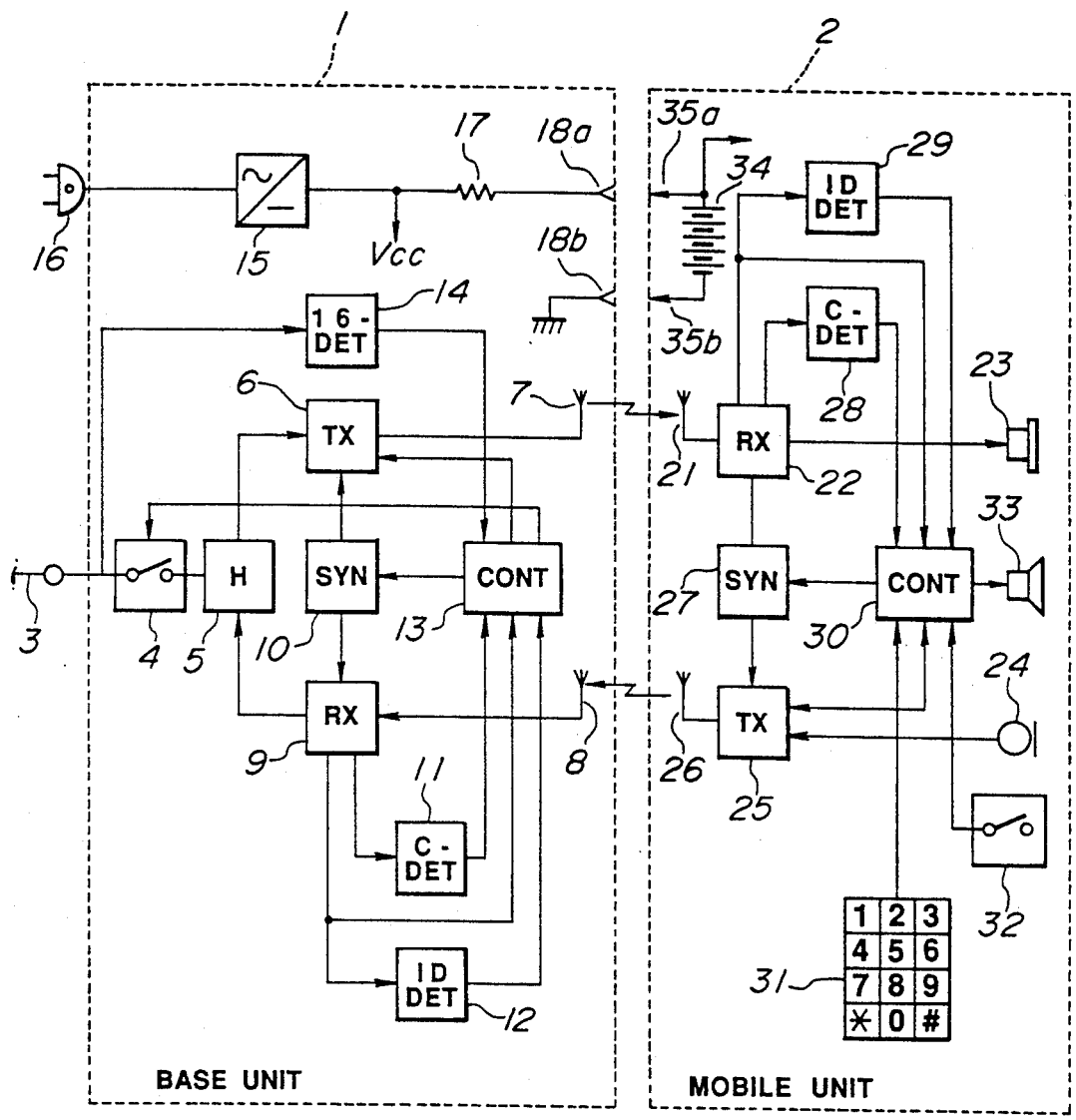
FIG. 15 a block diagram illustrating a conventional radio communication apparatus.

FIG. 3 is a block diagram of each of the radio units 65-1 to 65-k which are the same as the base unit 1 of FIG. 15 except that the former includes no components equivalent to the line switch 4 and the call signal detector 14 of the latter. The respective functions of the line switch 4 and call signal detector 14 are served by the switch unit 64A of the line controller 64 instead of the radio unit 65.

The speech line 68 from the switch unit 64A of the line controller 64 is connected to a hybrid circuit 5 while the control lines 69A and 69B from the control unit 64B of the line controller 64 are connected to the control circuit 13. In FIGS. 3 and 15, like reference numerals are given to elements serving similar functions for convenience of explanation.

Figure 4:
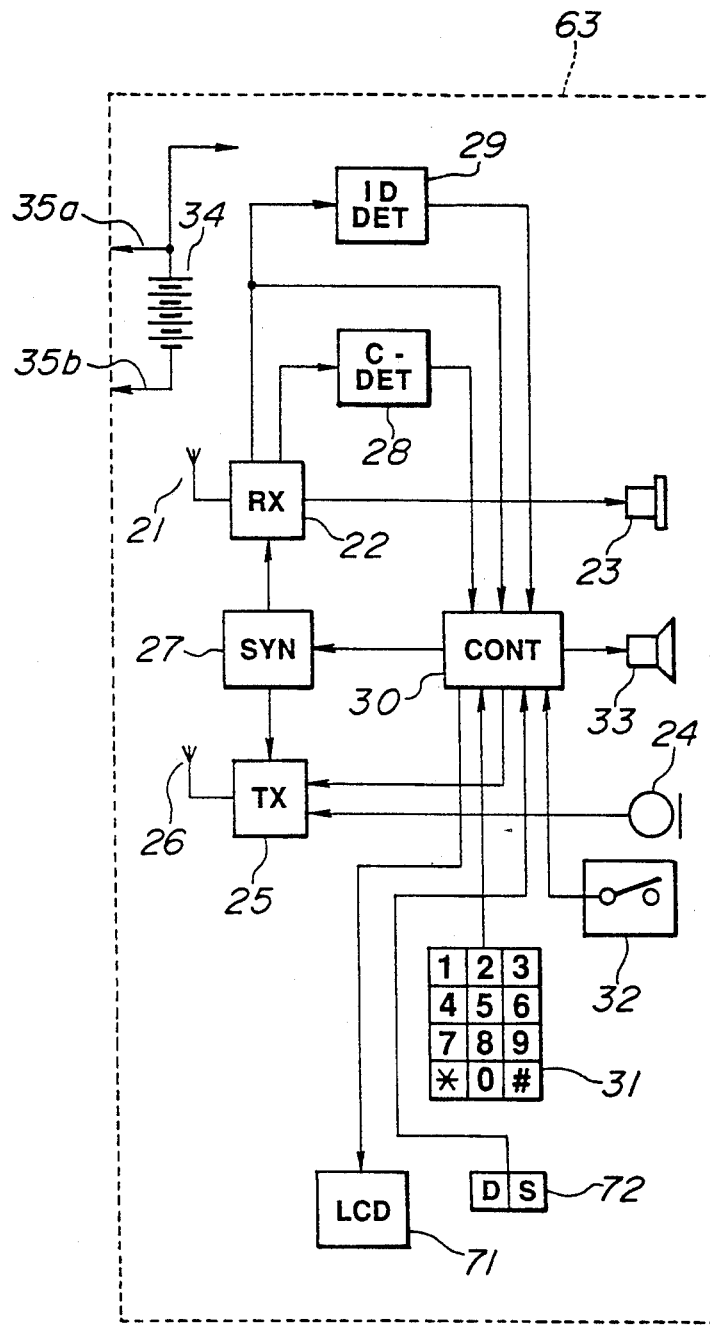
FIG. 4 is a block diagram illustrating a mobile unit of FIG. 1.

FIG. 4 is a block diagram of each of radio telephone sets 63-1 to 63-j. Each mobile unit includes a display 71 including, for example, a liquid crystal display, a key switch 72 in addition to a device equivalent to the mobile unit 2 of FIG. 15. In FIGS. 4 and 15, like reference numerals are given to elements serving similar functions for convenience of explanation.

In such radio communication apparatus, the radio units 65-1 to 65-k are connected through a multichannel access system, for example, using a single control channel and a plurality of speech channels. In this case, one radio unit has one or more mobile units, and ID codes are determined in accordance with combinations of radio units and mobile units. Therefore, communication can be made between the radio units 65-1 to 65-k and mobile units 65-1 to 63-j without cross talk.

Figure 16:
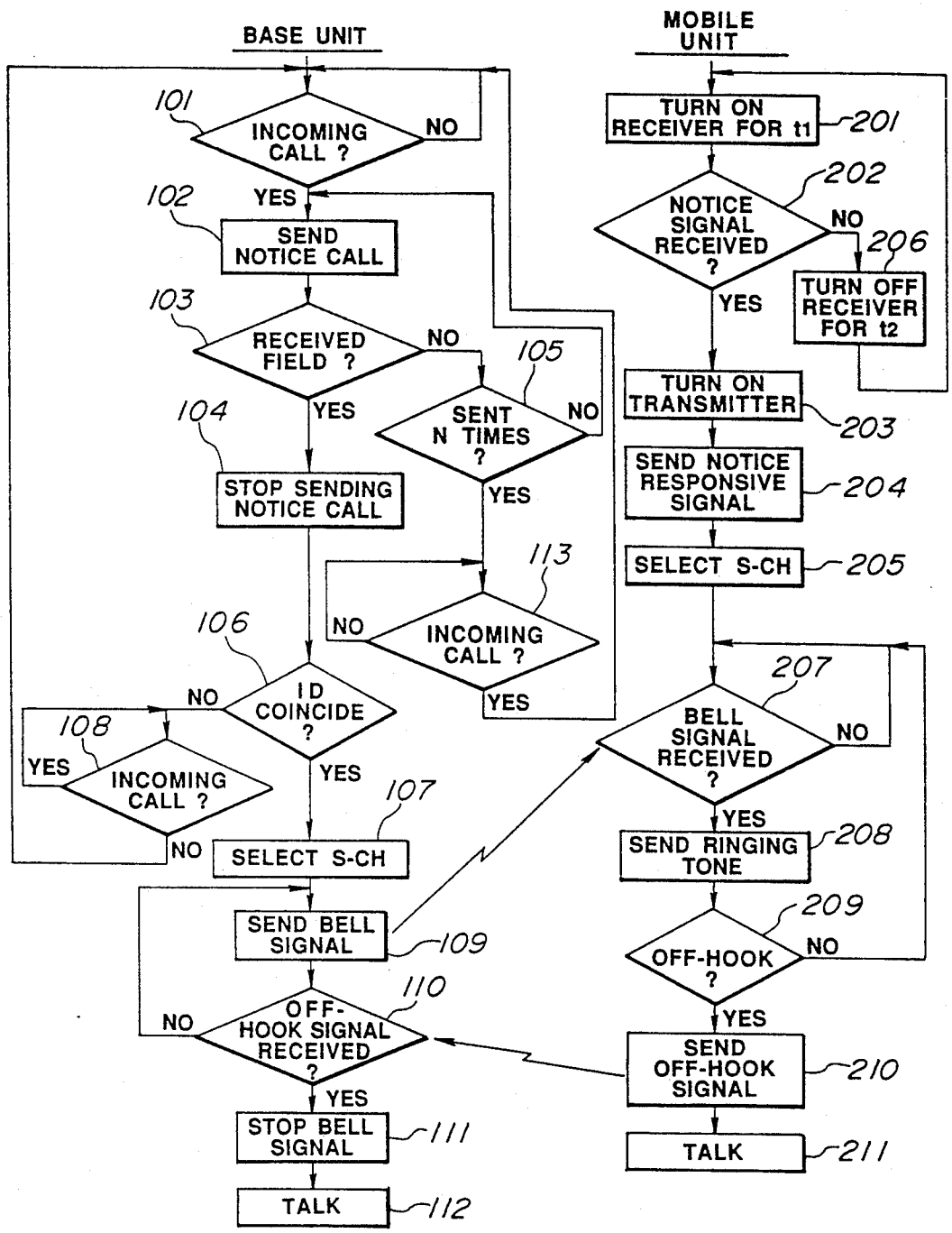
FIGS. 16 and 17 are flowcharts illustrating call reception and origination in the radio communication apparatus.

A call signal received through a wired telephone line is detected by the switch unit 64A of the line controller 64 and reported to the control circuit 13 of a radio unit 65 from the control unit 64B through the control line 69A. Therefore, signal reception similar to that shown in the FIG. 16 flowchart is performed between the radio unit and one mobile unit.

Figure 17:
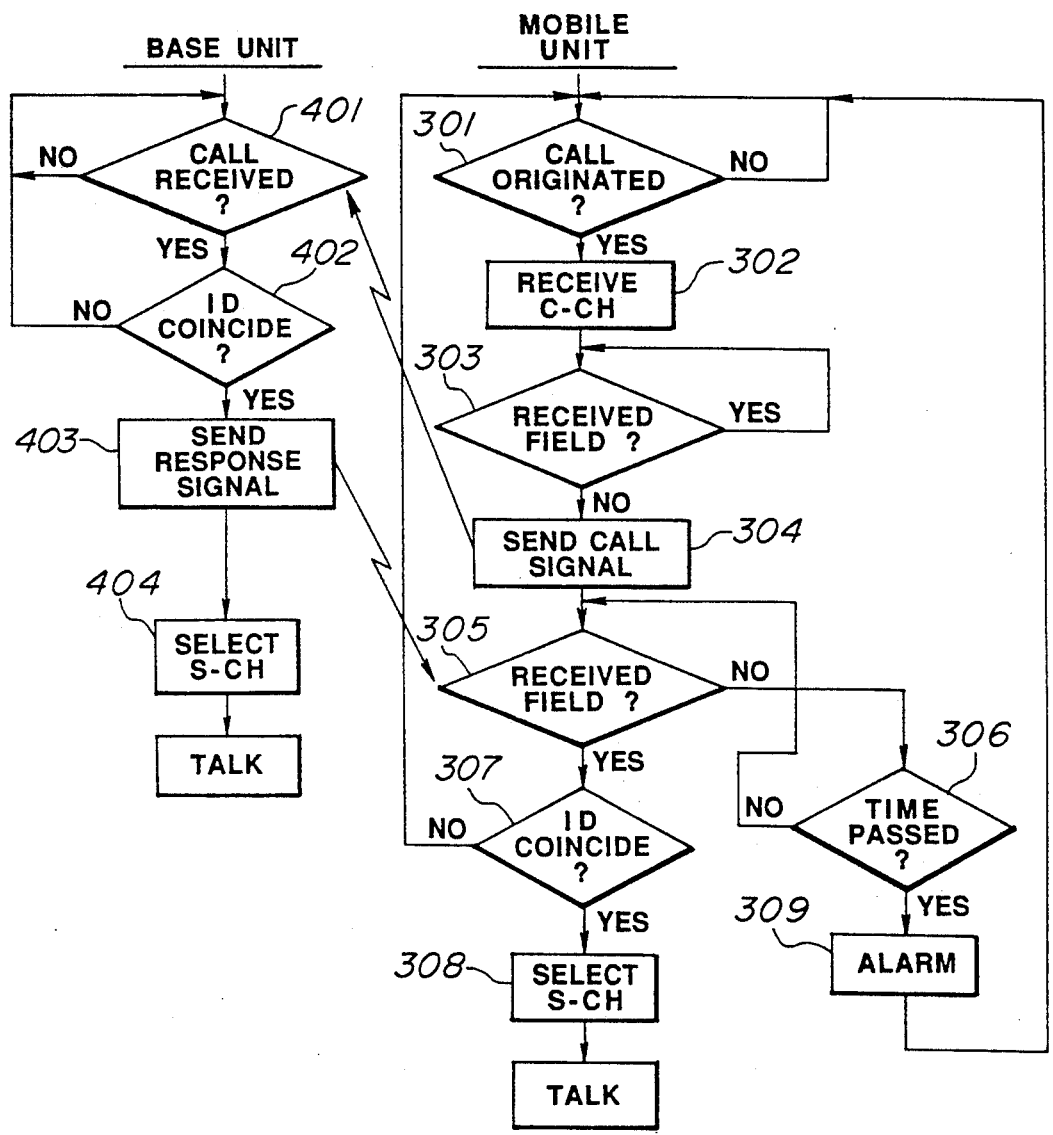
Figure 18:
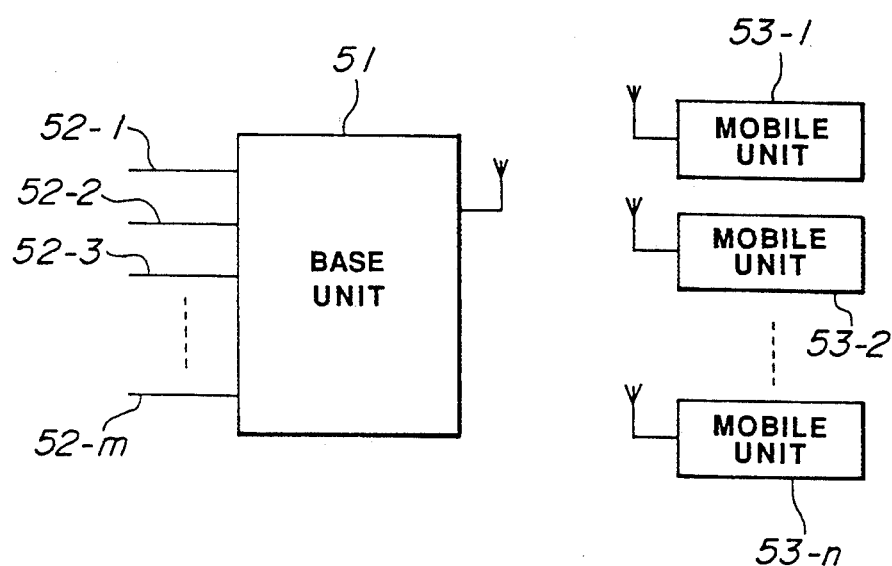
FIG. 18 is a schematic block diagram of another example of a radio communication apparatus.

When outgoing call origination is made, the control circuit 13 of the radio unit makes a request for the connection of a wired telephone line through a control line 69B to the control unit 64B of the line controller 64. In response to this request, a wired telephone line is connected through the switch unit 64A to a speech line 68 under control of the control unit 64B. Therefore, call origination is made between the radio unit and mobile unit concerned in accordance with the FIG. 17 flowchart.

In the radio communication apparatus of the particular embodiment, any mobile unit is able to know the status of use of the wired lines. The operation of the apparatus for that purpose will be described with reference to FIG. 5.

Assume that, for example, the hook switch 1-32 of the mobile unit 63-1 is turned on to go off-hook when the mobile unit 63-1 originates a call signal through the radio unit 65-1. Thus the call origination of FIG. 17 mentioned above is made, a call origination signal containing the ID code and a responsive signal are sent and received, respectively, between the mobile unit 63-1 and the radio unit 65-1, and the mobile unit 63-1 and the radio unit 65-1 are connected through a radio communication channel including a speech channel S-CH. At this time, the speech line 68-1 of the radio unit 65-1 is not yet connected through the switch unit 64A to a wired telephone line, so that the mobile unit 63-1 is not put in a telephone communication state.

When the key D of the key switch 72 of the mobile unit 63-1 is pressed, the control circuit 30 sends a line information request signal α to the transmitter 25 and hence to the radio unit 65-1.

In the radio unit 65-1, the receiver 9 receives the line information request signal α and delivers it to the control circuit 13, which then sends a line information request signal β through the control line 69B-1 to the control unit 64B of the line controller 64.

When the control unit 64B receives the line information request signal β, it determines through the switch unit 64A how the status of use of the wired telephone lines 61-1 to 61-i are and sends a line information signal α indicative of the status of use of the wired telephone lines to the radio units 65-1 through the control line 69A-1. The status of use include the busy, held and idle statuses of the wired telephone lines 61-1 to 61-i. The line information signal α includes respective line codes indicative of the wired telephone lines 61-1 to 61-i and information on the status of the wired telephone lines 61-1 to 61-i corresponding to the line codes.

When the control circuit 13 of the radio unit 65-1 receives a line information signal α, it delivers a line information signal β to the transmitter 6 for transmitting purposes.

When the receiver 22 of the mobile unit 63-1 receives the line information signal β and applies same to the control circuit 30, which then displays on the display 71 the status of the wired telephone lines shown by the line information signal β. Thus, the display 71 displays the busy, held and idle statuses of the wired telephone lines 61-1 to 61-i.

FIG. 6 illustratively shows the display aspect of the display 71 and more particularly, line codes 001-00i indicative of the wired telephone lines 61-1 to 61-i and symbols indicative of the status of use of the wired lines in correspondence to those codes. The symbols X, Y and Z show the busy, held and idle statuses, respectively.

Therefore, the user of the mobile unit 63-1 is able to know the status of use of the wired telephone lines 61-1 to 61-i.

Assuming that, for example, the wired telephone line 61-1 is idle, the user presses the key S of the key switch 72 of the mobile unit 63-1 and operates the dial unit 31 to input the line code 001 indicative of the wired telephone line 61-1. In response to this, the control circuit 30 delivers to the transmitter 25 a line selective signal α indicative of the line code 001 of the idle wired telephone line 61-1 for transmitting purposes.

In the radio unit 65-1, the receiver 9 receives the line selective signal α and applies it same to the control circuit 13, which then delivers a line selective signal β through the control line 69B-1 to the control unit 64B of the line controller 64.

When the control unit 64B receives the line selective signal β, it connects the wired telephone line 61-1 for the line code shown by the line selective signal β to the speech line 68-1 from the radio unit 65-1 through the switch unit 64A. The mobile unit 63-1 and the wired telephone line 61-1 are connected through the radio unit 65-1, speech line 68-1 and switch unit 64A and put into a speech communication state.

A dial tone is received from the wired telephone network 66 through the wired telephone line 61-1 and heard from the ear piece 23 of the mobile unit 63-1. If the dial unit 31 of the mobile unit 63-1 is operated in response to the tone to input telephone numbers sequentially, a dial signal α is sent from the mobile unit 63-1 to the radio unit 65-1 each time a telephone number is input, and a dial signal β is sent from the radio unit 65-1 to the wired telephone line 61-1. Thus, the called party on the wired telephone line 66 corresponding to the above telephone number is called. If the called party responds, the mobile unit 63-1 and the called party are able to talk with each other.

In the embodiment, as just described above, the status of use of the wired telephone lines are displayed on the displays of the mobile units when the mobile units place a call, and they are also able to select desired wired telephone lines on the basis of the displayed statuses of use of the wired lines and then shift to telephone communication through the selected wired telephone lines.

While in the particular embodiment the busy, held and idle statuses of the wired telephone lines 61-1 to 61-i are displayed on the display, only the line codes of usable idle wired telephone lines can be displayed on the display, in a reduced display space, as shown in FIG. 7.

If the statuses of use of the wired telephone lines are displayed on the display 71 of each mobile unit by pressing the key D of its key switch 72, the radio communication channel between that mobile unit and the radio unit concerned may be cut off immediately. In this case, only the status of use of the wired telephone lines are displayed and no desired wired telephone line is selected.

Another embodiment will be described with reference to FIGS. 8-10. In the particular embodiment, the statuses of use of the wired telephone lines are automatically displayed on the display of each mobile unit and the contents of the display are updated at predetermined intervals of time. To this end, in each mobile unit, a timer 73 is provided in the control circuit 30, as shown in FIG. 9, and applies a timing signal to the control circuit 30 at predetermined intervals of time T1.

Figure 8:
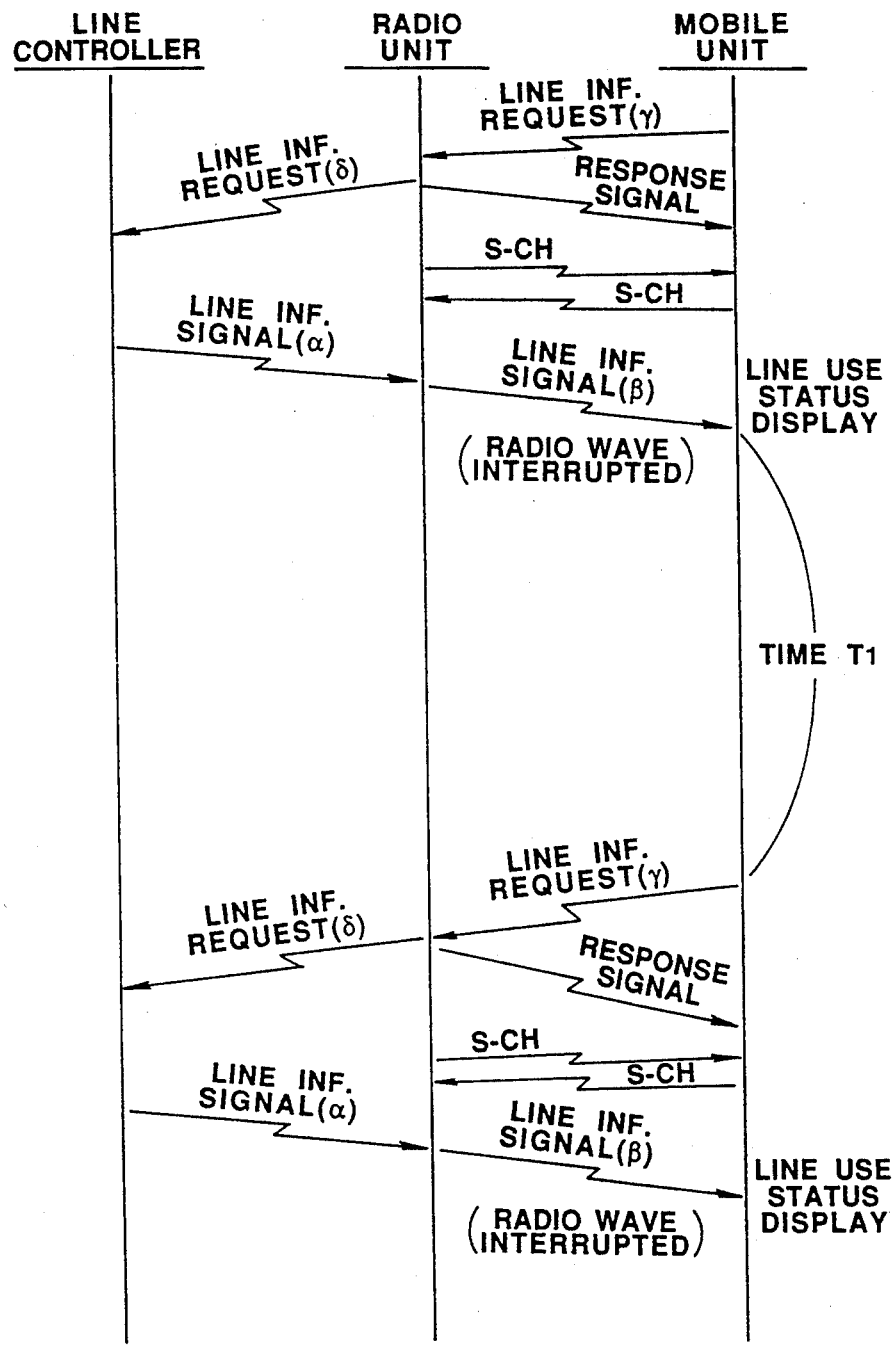
FIG. 8 illustrates the sequence of transmission of the signals in another embodiment of the radio communication apparatus according to the present invention.
Figure 9:
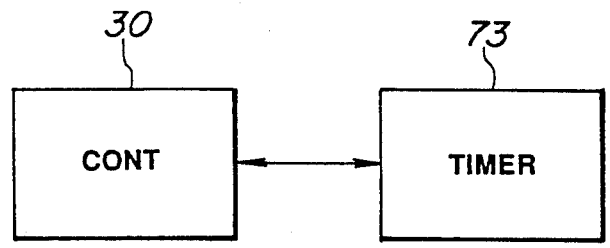
FIGS. 9 and 10 are a schematic block diagram of parts of a mobile unit in the apparatus of FIG. 8.

In the particular embodiment, the respective signals are sent and received in accordance with a diagram of FIG. 8. First, for example, when the control circuit 30 receives a timing signal from the timer 73 in the mobile unit 63-1 in its standby state, it sets the synthesizer 27 in the control channel C-CH and turns on the receiver 22. The received field detector 28 confirms an idle control channel and turns on the transmitter 25 to cause same to send a line information request signal γ, which includes its ID code.

When the radio unit 65-1 is in its standby state, it sets the synthesizer 10 in the control channel to maintain the receiver 9 on. Thus, when the radio unit 65-1 receives the line information request signal γ, the control circuit 13 checks whether the ID code contained in the line information request signal γ coincides with a registered one. If so, it turns on the transmitter 6 to send a responsive signal toward the mobile unit and a line information request signal δ through the control line 69B-1 to the control unit 64B of the line controller 64. The responsive signal includes the ID code for the radio unit and a signal designating a speech channel. Thereafter, the control circuit 13 switches the synthesizer 10 from the control channel to the speech channel designated by the responsive signal.

When the mobile unit 63-1 receives the responsive signal, its control channel 30 checks whether the ID code contained in the responsive signal coincides with a registered one. If so, it switches the synthesizer 27 to the speech channel designated by the responsive signal. Like the call origination, the radio unit and the mobile unit return to their standby state if the ID code does not coincide. The mobile unit returns to its standby state unless it receives a responsive signal from the base unit.

When the control unit 64B of the line controller 64 receives a line information request signal δ through the control line 69B-1 from the radio unit 65-1, it checks the status of use of the wired telephone lines 61-1 to 61-i through the switch unit 64A and delivers a line information signal α on the status of use of the wired lines to the radio unit 65-1 through the control line 69A-1.

When the control circuit 13 of the radio unit 65-1 receives a line information signal α, it delivers a line information signal β to the transmitter 6 to cause same to send the signal.

When the receiver 22 of the mobile unit 63-1 receives the line information signal β and delivers same to the control circuit 30, the control circuit 30 displays on the display 71 the status of use of the wired telephone lines indicated by the line information signal β.

Then, the radio unit 65-1 and the mobile unit 63-1 return to their standby state. When the control circuit 30 of the mobile unit 2 receives a timing signal from the timer 73 after a predetermined time T1 has passed since the radio unit 65-1 and the mobile unit 63-1 returned to their standby state, it again sends the line information request signal γ. Thus, when the mobile unit 2 receives the line information signal β from the radio unit 65-1, it updates the contents of the display 71 in accordance with the line information signal β. Thus, the displayed contents of the display 71 of the mobile unit 63-1 are updated at predetermined intervals of time T1.

The aspects of display by the display 71 may include the busy, held and idle statuses of the respective wired telephone lines as shown in FIG. 6, or the display of only idle wired lines, as shown in FIG. 7.

While in the above embodiment, the mobile units 63-1 to 63-j may send a line information request signal γ at intervals of time T1, the present invention is not limited to it. For example, when a line information request signal γ is sent from the mobile unit 63-1 to the radio unit 65-1 and a responsive signal is sent from the radio unit 65-1 to the mobile unit 63-1. another radio telephone set 62-2 may receive such responsive signal. In that case, the mobile unit 62-2 may set the synthesizer 27 in the speech channel designated by the responsive signal and turn on the receiver 22 to thereby update the contents of display by the display 71 in accordance with the line information signal β from the radio unit 65-1 and delay the transmission of the line information request signal γ by resetting the timer 73. Thus, the efficient use of electric waves is achieved.

When a first mobile unit receives from the radio unit a responsive signal to a line information request signal from a second mobile unit and updates the contents of display, the respective timers 73 of the mobile units may measure a time T1 and the timer of the first mobile unit does not measure the predetermined time T1. In that case, the respective mobile units are able to sequentially send line information request signals at a different times to the respective mobile units. As a result, even if each mobile unit does not frequently send a line information request signal, it can frequently receive line information signals to thereby update the displayed contents of the display frequently. Since the number of times of sending a line information request signal from a mobile unit is reduced, so that the power consumption is reduced.

Figure 10:
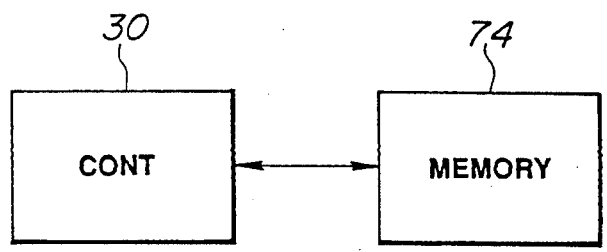

In the above embodiment, as shown in FIG. 10, a memory 74 may be provided in the control circuit 30 or a memory built in the control circuit 30 may be used to store the status of use of the wired lines. In that case, the status of use of the wired lines may not be displayed on the display 71, and the status of use of the wired lines stored in the memory may be displayed on the display 71, for example, in response to the hook switch 32 being turned on. In this case, the power consumed for displaying purposes may be reduced.

Figure 12:
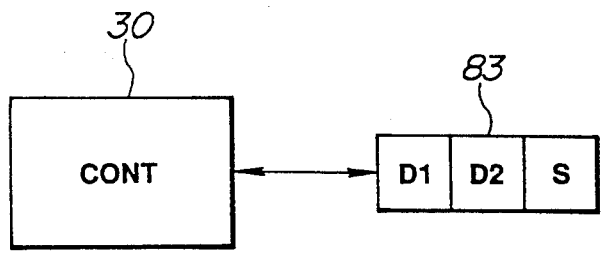
FIG. 12 is a schematic block diagram of parts of a mobile unit in the apparatus of FIG. 11.
Figure 11:
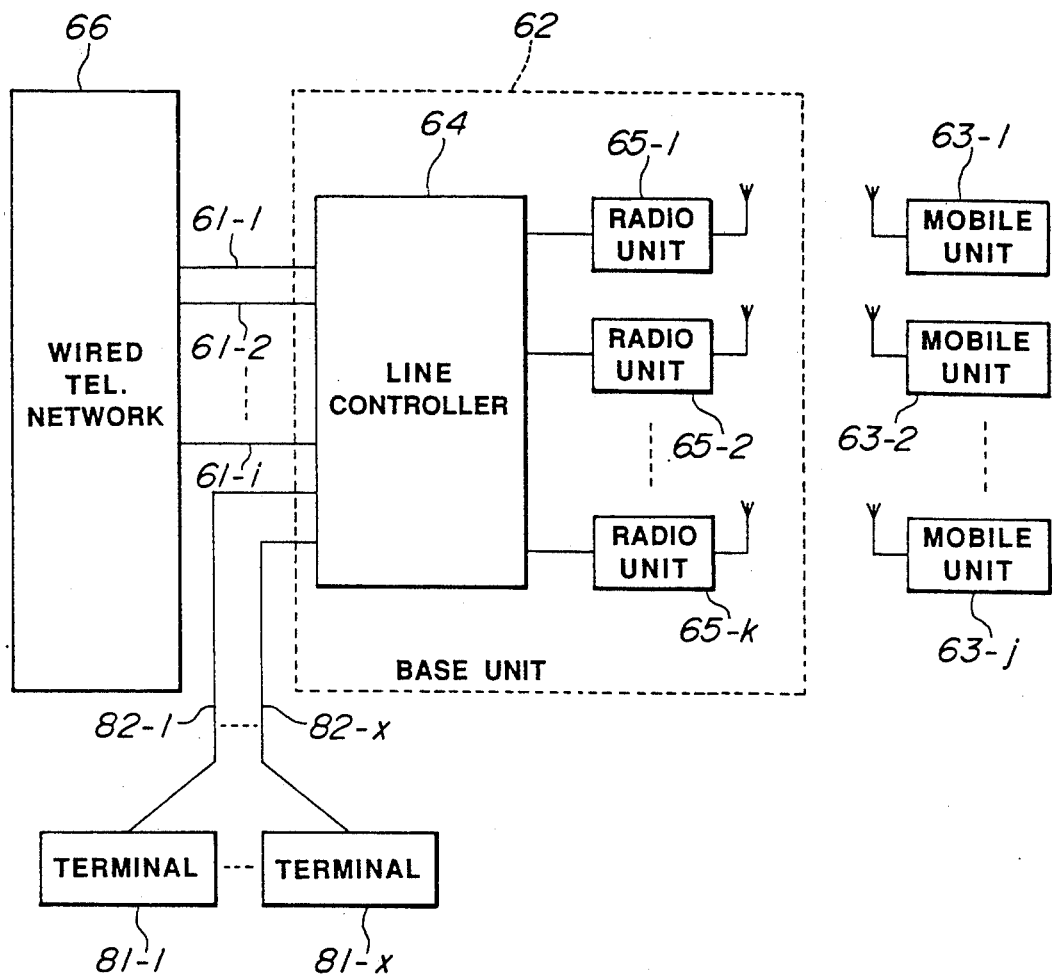
FIG. 11 is a block diagram of another embodiment of the radio communication apparatus according to another aspect of the present invention.

Another embodiment of the radio communication apparatus according to the present invention will be described with reference to FIGS. 11-14. In the present embodiment, as shown in FIG. 11, the line controller 64 of the base unit 62 has wired telephone lines 61-1 to 61-i or general telephone lines from a wired telephone network 66 and connected thereto and wired telephone lines 82-1 to 82-x or private lines from the wired terminals 81-1 to 81-x connected thereto. At one time, the status of use of the wired telephone lines 61-1 to 61-i designated generally as a line group I are displayed together on the mobile units and at another time, the status of use of the wired telephone lines 82-1 to 82-x designated generally as a line group Q are displayed together. To this end, as shown in FIG. 12, a key switch 83 is connected to the control circuit 30 of each mobile unit instead of the key switch 72 of FIG. 4. The key switch 83 includes keys D1, D2 and S with the key D1 corresponding to the line group I and with the key D2 corresponding to the line group Q.

Figure 5:
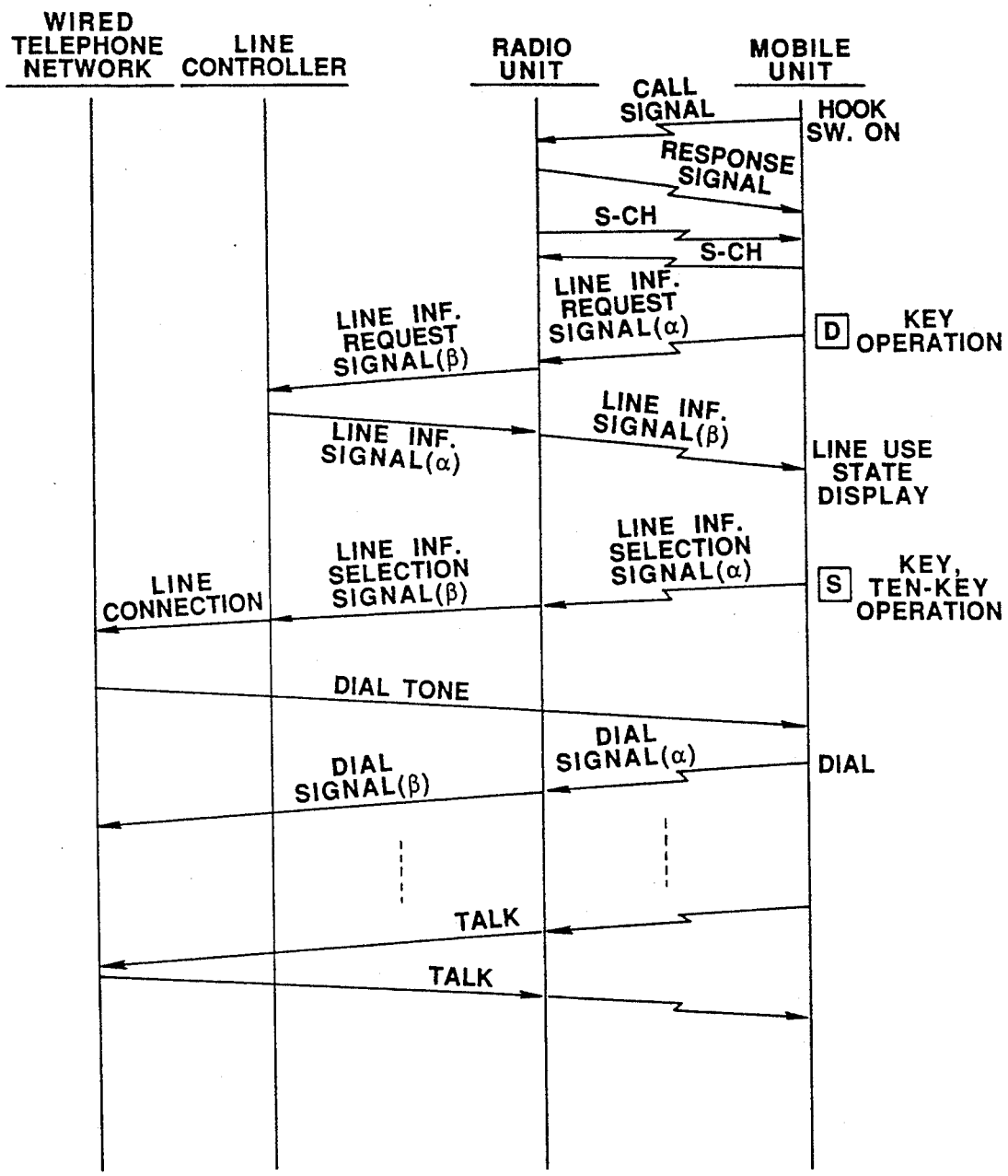
FIG. 5 illustrates the sequence of transmission of the signals in the apparatus of FIG. 1.

In the particular embodiment, a signal is transmitted and received as shown in FIG. 5. For example, when the hook switch 32 of the mobile unit 63-1 is turned on, a call origination signal and a response signal are transmitted from and to the mobile unit 63-1 to and from the radio unit 65-1 to thereby establish a speech channel radio communication channel therebetween. Thereafter, if the key D1 corresponding to the line group I of the key switch 83 in the mobile unit 63-1 is pressed, the mobile unit 63-1 sends a line information request signal α designating the line group I to the radio unit 65-1, and the radio unit 65-1 sends a line information request signal β to the line controller 64. In response to this signal β, the line controller 64 checks the status of use of the wired telephone lines 61-1 to 61-i belonging to the line group I and sends to the radio unit 65-1 the line information signal α indicative of the status of use of the wired lines. The radio unit 65-1 sends the line information signal β to the mobile unit 63-1, which in response to this signal, displays on the display 71 the status of use of the wired telephone lines 61-1 to 61-i designated by the line information signal β.

Figure 13:
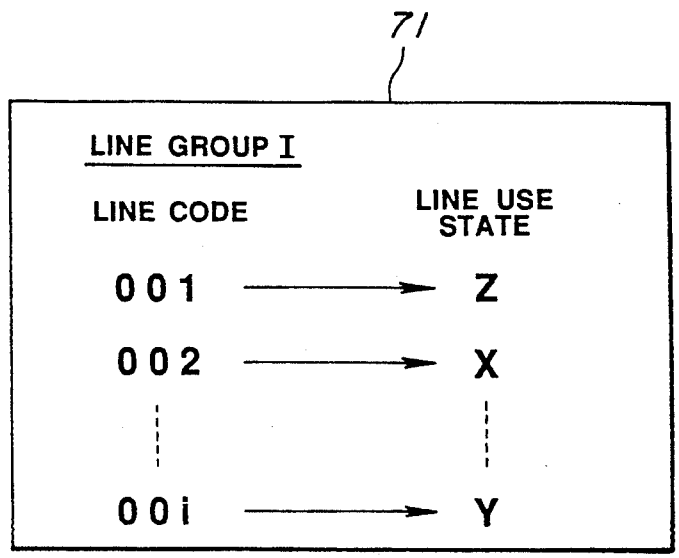
FIGS. 13 and 14 illustrate examples of the display in the mobile unit in the apparatus of FIG. 11.

FIG. 13 illustrates the respective aspects of the display, and more particularly, the group name "line group I", the line codes 001-00i indicative of the wired telephone lines 61-1 to 61-i, and symbols indicative of the statuses of use of the wired lines corresponding to the line codes 001-00i.

When the key D2 of the key switch 83 of the mobile unit 63-1 is pressed after a speech channel radio communication channel is established between the mobile unit 63-1 and the radio unit 65-1, the mobile unit 63-1 sends to the radio unit 65-1 a line information request signal α designating the line group Q and the radio unit 65-1 sends a line information request signal β to the line controller 64. In response to this signal β, the line controller 64 checks the status of use of the wired telephone lines 82-1 to 82-x belonging to the line group Q and sends a line information signal β indicative of such statuses to the radio unit 65-1. The radio unit 65-1 then sends a line information signal β to the mobile unit 63-1 to thereby display the status of use of the wired telephone lines 82-1 to 82-x, indicated by the line information β, on the display 71 of the mobile unit 63-1.

Figure 14:
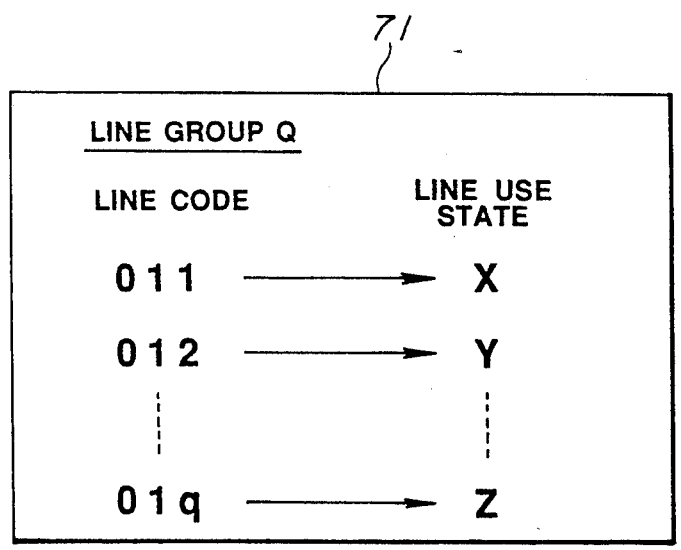

FIG. 14 illustrates the aspects of the display and more particularly, line group name the "line group Q", line codes 011-01x indicative of the wired telephone lines 61-1 to 61-x and symbols indicative of the status of use of the wired lines corresponding to the line codes 011-01x.

Therefore, if the key D1 of the key switch 83 of the mobile unit 63-1 is pressed, the status of use of the wired telephone lines 61-1 to 61-i belonging to the line group I are displayed on the display 71. When the key D2 of the key switch 83 is pressed, the status of use of the wired telephone lines 82-1 to 82-x belonging to the line group Q are displayed on the display 71.

If the speech channel radio communication channel between the radio unit 65-1 and the mobile unit 63-1 is set so as to be interrupted immediately after the line information signal $\beta$ is sent from the radio unit 65-1 to the mobile unit 63-1, the statuses of use of the wired lines are displayed on the display 71 of the mobile unit 63-1 and the processing ends.

If (1) the speech channel radio communication channel between the radio unit 65-1 and the mobile unit 63-1 is maintained uninterrupted, (2) the key S of the key switch 83 of the mobile unit 63-1 is then pressed, and (3) the dial unit 31 is operated to input a line code indicative of a desired wired telephone line, a line selective signal $\alpha$ indicative of the desired wired telephone line is sent from the mobile unit 63-1 to the radio unit 65-1. A line selective signal $\beta$ is then sent from the radio unit 65-1 to the line controller 64. In response to this signal, the line controller 64 connects the desired wired telephone line to the radio unit 65-1 to thereby place the mobile unit 63-1 in a state where same can talk over the desired telephone line.

While in the above embodiment the telephone lines are shown as being divided into the two groups I and Q, the present invention is not limited to them. Three or more groups of wired telephone lines may be provided, of course. For example, if there are general telephone lines incoming from the telephone network, private lines incoming from wired terminals, and private lines incoming from a private branch exchange, these lines may be divided into three corresponding groups and keys may be provided on the side of the mobile unit to select a respective one of the groups.

The wired telephone lines may be separated as required in accordance with the statuses of use of the wired telephone lines. The wired telephone lines may be divided normally into three groups, for example, of those in a busy state, those in a held state and those in an idle state. When a mobile unit designates any one of those groups, the base unit may deliver to the mobile unit line codes indicative of the wired telephone lines of that group to thereby display those codes in that mobile unit.

While in the three embodiments the use of the liquid crystal display is illustrated as the display of the mobile unit, varies displays may be used. For example, light emitting diodes for the wired telephone lines may be provided in the mobile units. By lighting, flashing and extinguishing the diodes, which of the busy, held and idle states each of the wired telephone lines is in is displayed.

The data format of a signal transmitted between a radio unit and a mobile unit and the data format of a signal transmitted between a ratio unit and the line controller may be the same or different.

The present invention may be applied to any radio communication apparatus which includes a base unit connectable to a plurality of wired telephone lines and a plurality of mobile units connectable through radio communication channels to the base unit, and is not limited by voice communication, data communication, etc.

As described above, according to the present invention, information on the statuses of use of the wired telephone lines is sent from the base unit to a mobile unit in accordance with a request for that information from the mobile unit and the statuses of use of the wired telephone lines are displayed in the mobile units in accordance with that information. Therefore, the mobile units are able to know the status of use of the wired telephone lines to thereby achieve more efficient use of the radio communication apparatus.

What is claimed is:

1. A radio communication apparatus comprising:
   a base unit connected to at least one wired line;
   a plurality of mobile units associated with the base unit and connected to the base unit through respective radio communication channels;
   call origination request means for sending a call origination request from the mobile units to the base unit;
   connection control means provided in the base unit for allocating one of the mobile units to the wired line, and controlling the connection between the wired line and the allocated mobile unit;
   information request means for sending an information request for requesting information on the status of use of the wired line from the mobile units to the base unit;
   request responding means for sending information on the status of use of the wired line from the base unit to the mobile units responsive to the information request; and
   display means provided at each of the mobile units, for displaying the status of use of the wired line in accordance with the information sent from the base unit by the request responding means;
   wherein the mobile units include timer means for measuring a predetermined time repeatedly, and for starting the information request means to cause same to make a request for the information each time the timer means measures the predetermined time.

2. A radio communication apparatus comprising:
   a base unit connected to at least one wired line;
   a plurality of mobile units associated with the base unit and connected to the base unit through respective radio communication channels;
   call origination request means for sending a call origination request from the mobile units to the base unit;
   connection control means provided in the base unit for allocating one of the mobile units to the wired line, and controlling the connection between the wired line and the allocated mobile unit;
   information request means for sending an information request for requesting information on the status of use of the wired line from the mobile units to the base unit;
   request responding means for sending information on the status of use of the wired line from the base unit to the mobile units responsive to the information request; and
   display means provided at each of the mobile units, for displaying the status of use of the wired line in accordance with the information sent from the base unit by the request responding means;

wherein the status of use of the wired line is that the wired line is either in busy state or in hold state; and the display means displays the status.

3. A radio communication apparatus comprising:
a base unit connected to a plurality of wired lines which is divided into at least two groups;
a plurality of mobile units associated with the base unit and connected through respective radio communication channels to the base unit;
connection control means provided in the base unit, for allocating the respective wired lines to the mobile units and controlling the connection of the mobile units to the respective wired lines allocated to the mobile units;
group information request means for sending a group information request for requesting information on the status of allocation and connection of the plurality of the wired lines from the mobile units to the base unit for each of the groups;
group request responding means for sending information on the status of use of the plurality of the wired lines from the base unit to the mobile units responsive to the group information request; and
display means provided at each of the mobile units, for displaying the status of use of the plurality of the wired lines in accordance with the information sent form the base unit by the group request responding means.

4. A radio communication apparatus according to claim 3, wherein the groups into which the plurality of wired lines are divided comprise a group of public lines and a group of private lines.

5. A radio communication apparatus according to claim 4, wherein the plurality of wired telephone lines are divided into a group of the wired lines in busy state, a group of the wired lines in hold state and a group of the wired lines in idle state;
the group request responding means sends for each of the groups identification information of the wired lines which belong to said each of the groups from the base unit to the mobile units; and
the display displays identification information of the wired lines which belong to said each of the groups.

6. A radio communication apparatus comprising:
a base unit connected to at least one wired line;
a plurality of mobile units connected to the base unit through respective radio communication channels, the mobile units respectively performing intermittent reception when the mobile units are in standby state;
call origination request means for sending a call origination request from the mobile units to the base unit;
connection control means provided in the base unit for allocating one of the mobile units to the wired line, and controlling the connection between the wired line and the allocated mobile unit;
information request means for sending an information request for status-of-use information on the wired line from the mobile units to the base unit;
reception control means for shifting the intermittent reception performed in the mobile units to continuous reception when the information request is sent;
request responding means for sending status-of-use information on the wired line from the base unit to the mobile units responsive to the information request; and
display means at each of the mobile units for displaying the wired line status-of-use information in accordance with the information sent from the base unit in response to the information request.

7. A radio communication apparatus according to claim 6, wherein the mobile units further include timer means for providing repeated predetermined time intervals, and for operating the information request means to send a request for the wired line status-of-use information at each of the predetermined time intervals.

8. A radio communication apparatus according to claim 6, wherein the mobile units operate the information request means to send a request for the wired line status-of-use information to the base unit;
the base unit operates the request responding means in response to the request for the wired line status-of-use information from the mobile units to send the wired line status-of-use information to the mobile units; and
the mobile units update in the display means the display of the wired line status-of-use information when the mobile units receive the wired line status-of-use information.

9. A radio communication apparatus according to claim 6, wherein the wired line status-of-use information is that the wired line is in a busy state; and
the display means displays the status of the wired line being in the busy state.

10. A radio communication apparatus according to claim 6, wherein the wired line status-of-use information is that the wired line is in a hold state; and
the display means displays the status of the wired line being in the hold state.

11. A radio communication apparatus according to claim 6, wherein the wired line status-of-use information is that the wired line is in an idle state; and
the display means displays the status of the wired line being in the idle state.

12. A radio communication apparatus according to claim 6, wherein the mobile units further include memory means for storing the wired line status-of-use information and commanding means for commanding the display of the information stored in the memory means, and the display means displays the wired line status-of-use information indicated by the information stored in the memory means responsive to the command by the commanding means.

13. A radio communication apparatus according to claim 6, wherein a plurality of wired lines are connected to the base unit, the radio communication apparatus further comprises:
selecting means provided in the mobile units, for selecting one of the wired lines in accordance with the use status of the respective wired lines displayed on the display means; and
means for sending from the mobile units to the base unit identification information on the selected one of the wired lines,
wherein the base unit sends to the connection control means the identification information received from the mobile units, and the connection control means connects the mobile units to the wired line indicated by the identification information.

14. A radio communication apparatus comprising:
a base unit connected to at least one wired line;

a plurality of mobile units associated with the base unit and connected to the base unit through respective radio communication channels;

call origination request means for sending a call origination request from the mobile units to the base unit;

connection control means provided in the base unit for allocating one of the mobile units to the wired line, and controlling the connection between the wired line and the allocated mobile unit;

information request means for sending an information request for requesting information on the status of use of the wired line from the mobile units to the base unit;

request responding means for sending information on the status of use of the wired line from the base unit to the mobile units responsive to the information request; and display means provided at each of the mobile units, for displaying the status of use of the wired line in accordance with the information sent from the base unit by the request responding means.

15. A radio communication apparatus according to claim 14, wherein one of the mobile units includes a timer for measuring a predetermined time and sends the information request to the base unit by the information request means when the predetermined time is measured by the timer, wherein each of the mobile units includes reception means for receiving the information on the status of use of the wired line sent by the request responding means provided in the base unit, and wherein the one of the mobile units resets the timer and updates the status displayed by the display means in accordance with the information received by the reception means while the mobile units other than the one mobile unit respectively update the status displayed by the display means in accordance with the information received by the reception means.

16. A radio communication apparatus according to claim 14, wherein the request responding means provided in the base unit sends to the mobile units the information on the status of use of the wired line including information on designation of at least one of the mobile units and on request timing by the information request means provided in the at least one of the mobile units, wherein each of the mobile units includes reception means for receiving the information sent by the request responding means provided in the base unit, and wherein at least one of the mobile units designated in the information received by the reception means sends the information request to the base unit by the information request means at a timing in accordance with the request timing in the information received by the reception means.

* * * * *

UNITED STATES PATENT AND TRADEMARK OFFICE
CERTIFICATE OF CORRECTION

PATENT NO. : 5,218,628
DATED : June 08, 1993
INVENTOR(S) : Koichi Ito

It is certified that error appears in the above-indentified patent and that said Letters Patent is hereby corrected as shown below:

Claim 8, column 13, line 29, change "form" to --from--.

Signed and Sealed this

Twenty-sixth Day of April, 1994

Attest:

BRUCE LEHMAN

*Attesting Officer*     *Commissioner of Patents and Trademarks*